3,230,143
ANTIHYPERTENSIVE INJECTION METHODS USING ACID ADDITION SALTS OF ALKYL ESTERS OF ALPHA - METHYL - 3,4 - DIHYDROXYPHENYLALANINE
Arnold D. Marcus, Philadelphia, Pa., assignor to Merck & Co., Inc., Rahway, N.J., a corporation of New Jersey
No Drawing. Filed May 14, 1965, Ser. No. 455,942
5 Claims. (Cl. 167—58)

This invention relates to a new emergency method of treating hypertension in humans. More specifically this invention relates to the rapid reduction of high blood pressure in an emergency by parenteral administration to humans of a composition in unit dosage from which comprises from 2.5 to 30% (weight/volume) of a pharmaceutically acceptable salt of alkyl ester of α-methyl-3,4-dihydroxyphenylalanine and water, the said composition being at a pH of 2–7 and sealed in a sterile package.

This application is a continuation-in-part of my copending application, Serial No. 247,845, filed December 28, 1962, now abandoned which was a continuation of a copending application, Serial No. 118,781, filed June 22, 1961, now abandoned.

α-Methyl-3,4-dihydroxyphenylalanine is now being developed as a new and potent antihypertensive drug for humans. When taken orally, however, it requires a certain initial period before the onset of the desired antihypertensive effect is manifested. There are emergencies in which an immediate antihypertensive effect is desired. In addition, surgery and other conditions may preclude oral administration or make it undesirable. For these reasons, it is important to be able to administer α-methyl-3,4-dihydroxyphenylalanine parenterally.

Solutions of α - methyl - 3,4-dihydroxyphenylalanine (often referred to as α-methyl DOPA) for parenteral use cannot conveniently be prepared at physiologically acceptable pH levels because of the relatively low solubility of both the racemic mixture and the active L isomer. The solubility of the racemic mixture is about 20 mg./ml. while a dosage of 50–200 mg./ml. is necessary. The L-isomer is soluble to the extent of about 10 mg./ml., whereas 25–200 mg./ml. are necesary for therapeutically and pharmaceutically acceptable preparations. Although suitable absolute quantities of the drug could be administered by using large volumes of solution, this approach is highly undesirable because of the volume required and particularly because this would also involve the administration of considerable amounts of stabilizers which are usually necessary to maintain the chemical and physical stability of the drug in solution.

I have found that, if instead of the free acid, one of the alkyl esters is used, a solution containing as much as 300 mg./ml. can be prepared either by adjusting the pH of the solution within the range of 2–7 or by using the hydrochloride or other water-soluble salt of the ester directly. Such concentrated solution cannot be achieved with the unesterified acid since the latter is poorly responsive to pH changes as reflected in changes of solubility. The parenteral use of such a solution is highly advantageous in the rapid reduction of high blood pressure.

The drug which is used in the compositions of my invention is thus an alkyl ester of α-methyl-3,4-dihydroxyphenylalanine, usually the methyl or ethyl, although the isopropyl, octyl, butyl, lauryl and octadecyl esters may also be used. Such esters are prepared, as described in U.S. 2,868,818 by reacting the free acid with the alcohol in the presence of a mineral acid such as HCl or $H_2SO_4$. The esterified acid is used in the preparation of the compositions of my invention either in the free amino form along with, or dissolved in, a buffer which yields a final pH of 2–7 or dissolved directly as a phsyicologically acceptable salt such as the hydrochloride. Since the antihypertensive effect resides solely in the L-stereo-isomer, the ester of this enantiomorph is usually employed. The usage of the ester is from 2.5 to 30% of the total composition.

When solutions of the esters of either the racemic or the L-form of the drug are prepared in a concentration range of 10–300 mg./ml. at pH levels of 2–7, the solutions rapidly darken and become almost black even after overnight storage at room temperature. This decomposition is greater at the higher pH's but occurs at all pH levels.

If, however, the water used to prepare the solutions is flushed free of oxygen and the solution is sealed into ampules under nitrogen, a much more stable product is achieved. While the preparation of single dose units is possible, multiple dose containers require additional means of stabilization. I have found that the inclusion of ethylenediamine tetraacetic acid (EDTA) or its salts serves to inhibit oxidation of esters of α-methyl DOPA. Protection is also afforded by various sulfhydryl compounds such as monothioglycerol. The best single agent for inhibiting oxidation of α-methyl-dihydroxyphenylalanine is a sulfur dioxide-based antioxidant such as sodium bisulfite, sodium sulfite or sodium metabisulfite. It is preferable to combine the sulfur dioxide containing materials with ethylenediamine tetraacetic acid or one of its salts and the best protection is achieved when all three types of agents are included in the same solution. The amount of stabilizer to be used varies from 0.05 to 2.0% of the total solution.

Suitable preservatives such as phenol, the alkyl esters of p-hydroxy benzoic acid, chlorobutanol, etc., may be used to insure sterility of multiple dose packages. The finished solutions can be easily sterilized by conventional filtration techniques.

It is an advantage of the compositions used in the method of this invention that they contain in aqueous solution sufficient quantities of the active therapeutic agent to be medicinally useful. Parenteral administration to reduce high blood pressure rapidly requires 300–1000 mg. of the active ester. The response occurs in an hour or so and lasts half a day. It is a further advantage of the compositions used in the method of this invention that they include suitable stabilizing agents that remain chemically and physically intact for prolonged periods. It is most surprising that whereas the free acid has such low solubility regardless of pH levels consonant with physiologic acceptability and suitable stability, it is possible to achieve such concentration of solutions with the esters at the desirable pH's.

My invention can be illustrated by the following examples which describe compositions for parenteral administration used to fill ampules, vials and multiple dose vials.

*Example 1* dl-α-Methyl DOPA methyl ester HCl _____ mg__ 50
Pyrogen free sterile distilled water, to _____ ml__ 1
Fill and seal under nitrogen.

*Example 2*

1-α-methyl DOPA ethyl ester _____ mg__ 25
Buffer (pH 2–6), to _____ ml__ 1
Sterilize by filtration and seal under nitrogen.

*Example 3*

1-α-methyl DOPA ethyl ester HCl _____ mg__ 25–200
Disodium EDTA _____ mg__ 0.5
Pyrogen free sterile distilled water, to ____ ml__ 1
Seal into ampules under nitrogen.

Example 4

| | | |
|---|---|---|
| 1-(or dl)-α-methyl DOPA ethyl ester HCl | mg | 25–300 |
| Sodium bisulfite | mg | 1–3.5 |
| Pyrogen free sterile distilled water, to | ml | 1 |

Seal into ampules.

Example 5

| | | |
|---|---|---|
| 1-(or dl)-α-methyl DOPA isopropyl ester | mg | 25–200 |
| Sodium bisulfite | mg | 1–3.5 |
| Preservative | | |
| Disodium EDTA | mg | 0.5 |
| Buffer (pH 3–6), to | ml | 1 |

Sterilize by filtration.

Example 6

| | | |
|---|---|---|
| 1-(or dl)-α-methyl DOPA ethyl ester HCl | mg | 25–300 |
| Monothioglycerol | mg | 1–10 |
| Buffer or water, to | ml | 1 |

Sterilize by filtration and fill and seal under nitrogen into ampules.

Example 7

| | | |
|---|---|---|
| 1-(or dl)-α-methyl DOPA ethyl ester | mg | 25–300 |
| Sodium bisulfite | mg | 1–3.5 |
| Monothioglycerol | mg | 1–10 |
| Disodium EDTA | mg | 0.5 |
| Methyl-p-hydroxybenzoate | mg | 1.5 |
| Propyl-p-hydroxybenzoate | mg | 0.2 |
| Buffer (pH 2–6), to | ml | 1 |

Example 8

| | | |
|---|---|---|
| 1-(or dl)-α-methyl DOPA ethyl ester HCl | mg | 25–300 |
| Sodium bisulfite | mg | 1–3.5 |
| Monothioglycerol | mg | 1–10 |
| Disodium EDTA | mg | 0.5 |
| Methyl-p-hydroxybenzoate | mg | 1.5 |
| Propyl-p-hydroxybenzoate | mg | 0.2 |
| Water or buffer, to | ml | 1 |

Sterilize by filtration and package in ampules, vials, or multiple dose vials.

I claim:

1. The method of rapidly decreasing high blood pressure in an emergency which comprises parenteral administration to humans of a pharmaceutical antihypertensive composition comprising from 2.5 to 30% of a pharmaceutically acceptable mineral acid addition salt of an alkyl ester of α-methyl-3,4-dihydroxyphenylalanine, said alkyl group having less than 19 carbons, and oxygen-free water, the said composition being at a pH of 2–6.

2. The method of claim 1 in which the said composition also includes from 0.05 to 2.0% of at least one stabilizer selected from the group consisting of ethylenediamine tetraacetic acid, monothioglycerol and water-soluble sulfites selected from the group consisting of the sulfite, bisulfite and m-bisulfite of sodium.

3. The method of claim 2 in which the said stabilizer is a combination of more than one of the said group.

4. The method of rapidly decreasing high blood pressure in an emergency which comprises parenteral administration to humans of a composition consisting of 20% of 1-α-methyl-3,4-dihydroxyphenylalanine ethyl ester hydrochloride, 0.35% sodium bisulfite, 1% monothioglycerol, 0.05% disodium ethylenediamine tetraacetic acid, 0.15% methyl-p-hydroxybenzoate, 0.02% propyl-p-hydroxybenzoate and the remainder to 100% sterile water buffered at pH 2–6.

5. The method of rapidly decreasing high blood pressure in an emergency which comprises parenteral administration to humans of a composition consisting of 2.5% 1-α-methyl-3,4-dihydroxyphenylalanine ethyl ester hydrochloride, 0.35% sodium bisulfite, 1% monothioglycerol, 0.05% disodium ethylenediamine tetraacetic acid, 0.15% methyl-p-hydroxybenzoate, 0.02% propyl-p-hydroxybenzoate and the remainder to 100% sterile water buffered at pH 2–6.

References Cited by the Examiner

UNITED STATES PATENTS 2,868,818   1/1959   Pfister _____ 167—65 X

OTHER REFERENCES

Jenkins et al.: The Art of Compounding, McGraw-Hill Book Co., New York, New York, (1957) pp. 185–186, 194–196, 199, 208–209, 211 and 276.

Merck Index, 7th ed., Merck and Co., Rahway, N.J. (1960), p. 1037.

JULIAN S. LEVITT, *Primary Examiner.*